(12) United States Patent
Kiyoshige

(10) Patent No.: US 8,798,312 B2
(45) Date of Patent: Aug. 5, 2014

(54) MEMORY AND IMAGE GENERATION APPARATUS

(75) Inventor: Ryuichi Kiyoshige, Tokyo (JP)

(73) Assignee: Olympus Corporation, Tokyo (JP)

( * ) Notice: Subject to any disclaimer, the term of this patent is extended or adjusted under 35 U.S.C. 154(b) by 208 days.

(21) Appl. No.: 13/313,225

(22) Filed: Dec. 7, 2011

(65) Prior Publication Data

US 2012/0163735 A1 Jun. 28, 2012

(30) Foreign Application Priority Data

Dec. 24, 2010 (JP) ................................. 2010-286884

(51) Int. Cl.
*G06K 9/00* (2006.01)
*H04N 5/225* (2006.01)

(52) U.S. Cl.
USPC ...................................... 382/100; 348/207.99

(58) Field of Classification Search
None
See application file for complete search history.

(56) References Cited

U.S. PATENT DOCUMENTS

| 8,564,714 | B2 * | 10/2013 | Umeyama | 348/372 |
| 2002/0174337 | A1 * | 11/2002 | Aihara | 713/172 |
| 2006/0087564 | A1 * | 4/2006 | Kawamura | 348/211.99 |
| 2008/0284855 | A1 * | 11/2008 | Umeyama et al. | 348/207.1 |

FOREIGN PATENT DOCUMENTS

| JP | 2001-195553 A | 7/2001 |
| JP | 2004-235891 A | 8/2004 |
| JP | 2009-211562 A | 9/2009 |

OTHER PUBLICATIONS

Office Action mailed Jun. 10, 2014, issued in Japanese Patent Application No. 2010-286884 with English Translation (4 pages).

* cited by examiner

*Primary Examiner* — Andrae S Allison
(74) *Attorney, Agent, or Firm* — Westerman, Hattori, Daniels & Adrian, LLP

(57) ABSTRACT

A memory may include an interface unit to which setup information, an image file corresponding to the setup information, and instruction information are input from a device including a memory interface performing input/output with the memory, the setup information being used for setup for a connection to a wireless network, the instruction information indicating an instruction to process the image file, a storage unit that stores the setup information and the image file that have been input to the interface unit, a processing unit that processes the image file, which has been stored in the storage unit, based on the instruction information that has been input to the interface unit, a communication unit that performs wireless communication, and a setting unit that performs network setup based on the setup information corresponding to the image file processed by the processing unit among the setup information stored in the storage unit.

7 Claims, 17 Drawing Sheets

FIG. 6

| NETWORK NAME | ~601 |
| NETWORK AUTHENTICATION SCHEME | ~602 |
| DATA ENCRYPTION SCHEME | ~603 |
| PASSPHRASE | ~604 |
| CONNECTION PRIORITY | ~605 |
| IMAGE IDENTIFIER | ~606 |
| SELECTION INFORMATION | ~607 |

FIG. 7

```
network={
    NETWORK NAME= "WLAN-AP"
    NETWORK AUTHENTICATION SCHEME= "WPA-PSK"
    DATA ENCRYPTION SCHEME= "TKIP"
    PASSPHRASE= "12345678"
    CONNECTION PRIORITY= "1"
    IMAGE IDENTIFIER= "wlan-ap.jpg"
    SELECTION INFORMATION= "ON"
}                                                   701 network={
    NETWORK NAME= "Local-Spot"
    NETWORK AUTHENTICATION SCHEME= "OPEN"
    DATA ENCRYPTION SCHEME= ""
    PASSPHRASE= ""
    CONNECTION PRIORITY= "2"
    IMAGE IDENTIFIER= "local-spot.jpg"
    SELECTION INFORMATION= "OFF"
}                                                   702 network={
    NETWORK NAME= "XYZ"
    NETWORK AUTHENTICATION SCHEME= "WPA-PSK"
    DATA ENCRYPTION SCHEME= "AES"
    PASSPHRASE= "12345678"
    CONNECTION PRIORITY= "3"
    IMAGE IDENTIFIER= "xyz.jpg"
    SELECTION INFORMATION= "OFF"
}                                                   703
```
711

MEMORY AND IMAGE GENERATION APPARATUS

BACKGROUND OF THE INVENTION

1. Field of the Invention

The present invention relates to a memory that stores image files and an image generation apparatus that generates image files.

Priority is claimed on Japanese Patent Application No. 2010-286884, filed Dec. 24, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Japanese Unexamined Patent Application, First Publication No. 2001-195553 discloses an apparatus that can be used as a wireless communication apparatus, as well as a storage device, in which a memory card has a wireless communication function and the memory card is inserted into a memory card slot of a device such as a digital camera. Accordingly, if writing of photograph (moving image) data from a host device such as a digital camera to a memory card is performed, the photograph data is uploaded (transmitted) to an external device such as a personal computer through wireless communication using the wireless communication function and stored in the external device such as a personal computer. In order to use the wireless communication function in such a memory card, it is necessary to perform wireless communication setup (network setup) for a connection party using a host device such as a personal computer in advance.

If there is setup information about a plurality of connection destinations in the memory card and the memory card detects a plurality of networks corresponding to its setup information, the memory card may begin to connect to a network not desired by a user. This occurs when there are a plurality of options of communication parties, for example, when setup information for connection via a wireless access point and setup information for communication with a personal computer of a user not via a wireless access point are recorded in a memory card having a wireless LAN (IEEE802.11b/g) function.

Since the memory card has no user interface, a connection party cannot be selected according to a use scene. Further, if a connection to a connection party other than a connection party corresponding to setup information recorded in the memory card is desired, an application for performing network setup is required and, accordingly, it is necessary to perform the network setup again using a host device such as a personal computer, which is a troublesome task. Thus, in a digital camera having no application for performing network setup to use a memory card having a wireless communication function, the network setup cannot be performed.

SUMMARY

The present invention provides a memory capable of easily performing setup for a connection to a wireless network. The present invention also provides an image generation apparatus capable of recording information for easily performing setup for a connection to a wireless network in a memory having a communication function.

A memory may include: an interface unit to which setup information, an image file corresponding to the setup information, and instruction information are input from a device including a memory interface, the memory interface performing input/output with the memory, the setup information being used for setup for a connection to a wireless network, the instruction information indicating an instruction to process the image file; a storage unit that stores the setup information and the image file that have been input to the interface unit; a processing unit that processes the image file, which has been stored in the storage unit, based on the instruction information that has been input to the interface unit; a communication unit that performs wireless communication; and a setting unit that performs network setup based on the setup information corresponding to the image file processed by the processing unit among the setup information stored in the storage unit.

A memory may include: a storage unit that stores setup information and an image file corresponding to the setup information, the setup information being used for setup for a connection to a wireless network; a generation unit that generates the image file corresponding to the setup information; an interface unit to which instruction information indicating an instruction to process the image file is input from a device including a memory interface, the memory interface performing input/output with the memory; a processing unit that processes the image file, which has been stored in the storage unit, based on the instruction information that has been input to the interface unit; a communication unit that performs wireless communication; and a setting unit that performs network setup based on the setup information corresponding to the image file processed by the processing unit among the setup information stored in the storage unit.

The storage unit may further store content data having a time stamp set therein. The generation unit may set a time stamp in the generated image file based on the time stamp of the content data.

The generation unit may set the time stamp in the image file so that the time stamp of the image file is earlier in terms of time than that of the content data.

A priority may be set in the setup information. The generation unit may set a time stamp in the generated image file based on the priority of the setup information.

The memory may further include: a judgment unit that determines whether or not the memory is capable of connecting to a wireless network that corresponds to the setup information. The generation unit may generate the image file that corresponds to only the setup information corresponding to the wireless network that has been determined to be a wireless network to which the memory is capable of connecting by the judgment unit.

If the instruction information indicates an instruction for a process of outputting the image file to the device for viewing of an image, then the setting unit may perform network setup based on the setup information corresponding to the image file, which has been output to the device, among the setup information stored in the storage unit.

An image generation apparatus may include: a storage unit that stores setup information used for setup for a connection to a wireless network; a generation unit that generates an image file corresponding to the setup information stored in the storage unit; and a recording unit that records the setup information, which has been stored in the storage unit, and the image file, which has been generated by the generation unit, in a memory having a wireless communication function.

The storage unit may further store content data having a time stamp set therein. The generation unit may set a time stamp in the generated image file based on the time stamp of the content data.

The generation unit may set the time stamp in the image file so that the time stamp of the image file is earlier in terms of time than that of the content data.

A priority may be set in the setup information. The generation unit may set a time stamp in the generated image file based on the priority of the setup information.

According to the memory of the present invention, setup for a connection to a wireless network can be easily performed by performing network setup based on setup information corresponding to an image file processed based on instruction information input from a device having a memory interface.

Further, according to the image generation apparatus of the present invention, information for easily performing setup for a connection to a wireless network can be recorded in the memory having a wireless communication function by recording setup information and an image file corresponding to the setup information in the memory having a wireless communication function.

BRIEF DESCRIPTION OF THE DRAWINGS

The above features and advantages of the present invention will be more apparent from the following description of certain preferred embodiments taken in conjunction with the accompanying drawings, in which:

FIG. 6 is a reference diagram illustrating network setup information in accordance with the first preferred embodiment of the present invention;

FIG. 7 is a reference diagram illustrating details of the network setup information in accordance with the first preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

In the following description, a memory card or a memory device is an example of a memory.

Figure 1:
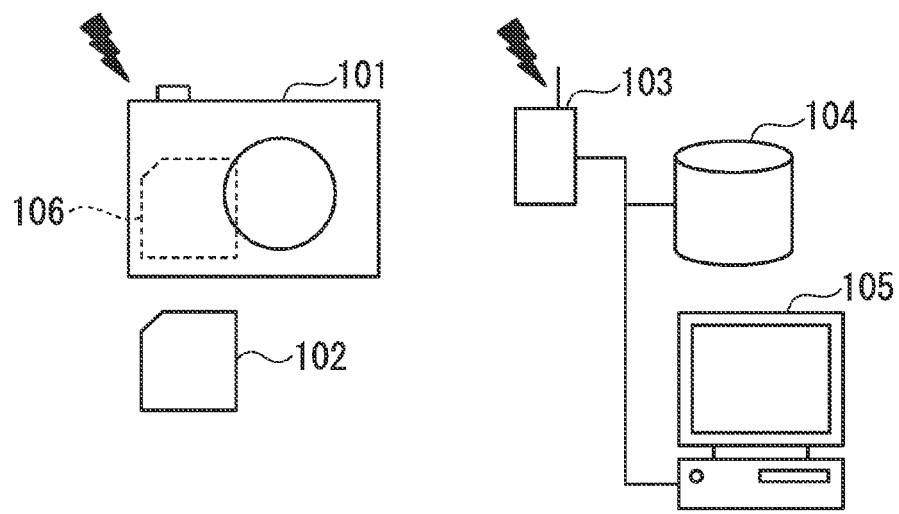
FIG. 1 is a block diagram illustrating a configuration of a system in accordance with a first preferred embodiment of the present invention.

FIG. 1 is a block diagram illustrating a configuration of a system using a memory card 102 in accordance with a first preferred embodiment of the present invention.

System Configuration

As shown in FIG. 1, a digital camera 101 includes a memory card slot 106 that is a memory interface into which a memory card can be inserted and which performs input/output with the memory card. In the first preferred embodiment, a description will be given using a digital camera, but the present invention is not limited to the digital camera and any device into which a memory card can be inserted may be used. The memory card 102 includes a wireless communication function, and is inserted into the digital camera 101, such that the wireless communication function can be used.

An access point 103 is a connection destination for wireless communication. The access point 103 is connected to, for example, a storage device 104 having a moving image storing function or a personal computer 105 having service such as a moving image storing function, similar to the storage device 104. If the digital camera 101 performs photographing, acquired photograph data (an image file of a moving image) is written to the memory card 102, which drives a wireless communication apparatus included in the memory card 102 and transmits the photograph data to the storage device 104 or the personal computer 105 via the access point 103. Further, the personal computer 105 has software for performing network setup for a memory card and also includes a memory card slot. The network setup for the memory card 102 can be performed by inserting the memory card 102 into the memory card slot of the personal computer 105 and operating the software.

Configuration of Memory Card

Figure 2:
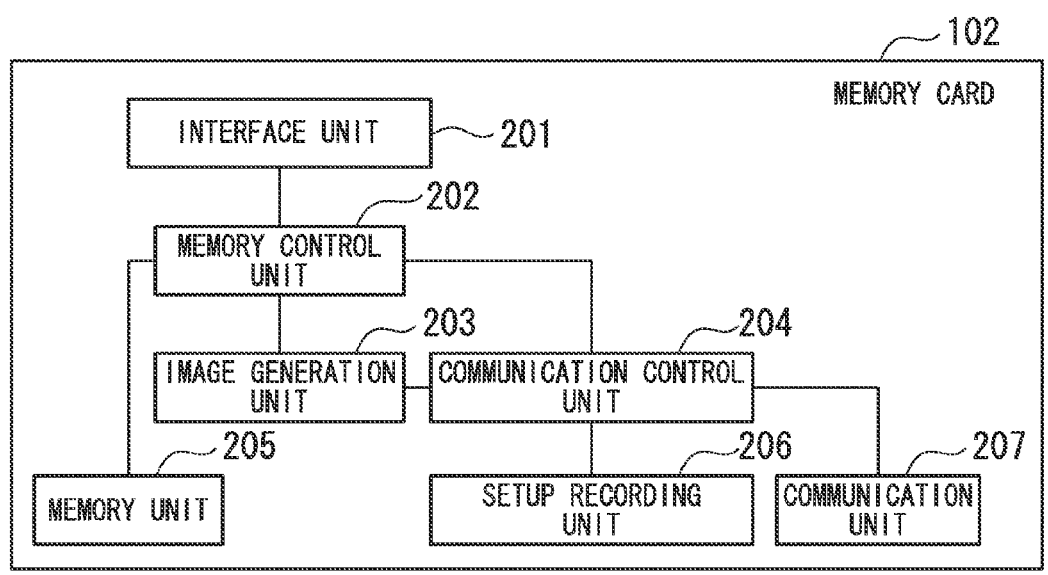
FIG. 2 is a block diagram illustrating a configuration of a memory card in accordance with the first preferred embodiment of the present invention.

FIG. 2 is a block diagram illustrating a configuration of the memory card 102 in accordance with the first preferred embodiment of the present invention. The memory card 102 includes an interface unit 201, a memory control unit 202, an image generation unit 203, a communication control unit 204, a memory unit 205, a setup recording unit 206, and a communication unit 207.

When the memory card 102 is inserted into a memory card slot of the digital camera 101 or the personal computer 105 that is a host device, the interface unit 201 performs data communication with the host device. The memory control unit 202 performs control of the inside of the memory card 102, such as control of reading of data such as an image file from the memory unit 205 and writing of data to the memory unit 205, according to a command of the data communication performed via the interface unit 201.

The image generation unit 203 includes an image data encoder, and generates an image file according to network setup information indicating content of network setup recorded in the memory card 102. The communication control unit 204 includes a communication protocol for performing simple setup of wireless communication or wireless data communication, and performs control of the network setup or the wireless communication based on the network setup information. The memory unit 205 stores image files communicated via the interface unit 201 according to an instruction of the memory control unit 202.

The setup recording unit 206 stores the network setup information indicating the content of the network setup or stores a bitmap font image, in addition to a previously prepared image file indicating the simple setup or a template image used when the image file is generated. The communication unit 207 includes a communication IC or an antenna for performing the wireless communication, and performs the wireless communication according to an instruction of the communication control unit 204.

Screen Display of Network Setup

Figure 3:
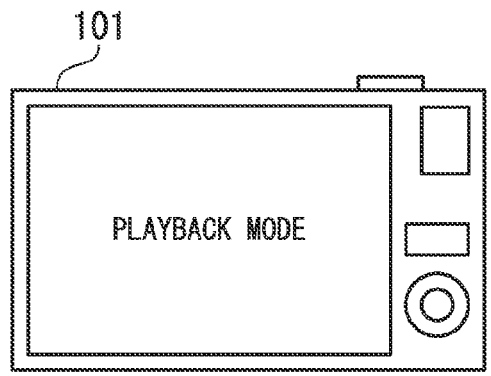
FIG. 3 is a reference diagram illustrating a screen for an image playback mode in accordance with the first preferred embodiment of the present invention.
Figure 4:
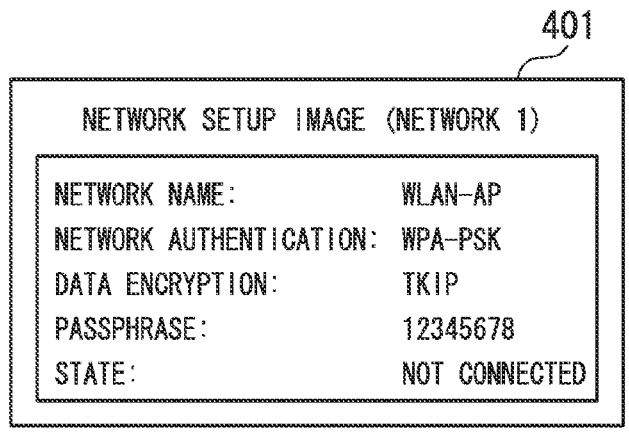
FIG. 4 is a reference diagram illustrating a screen when a network setup image is displayed in accordance with the first preferred embodiment of the present invention.
Figure 5:
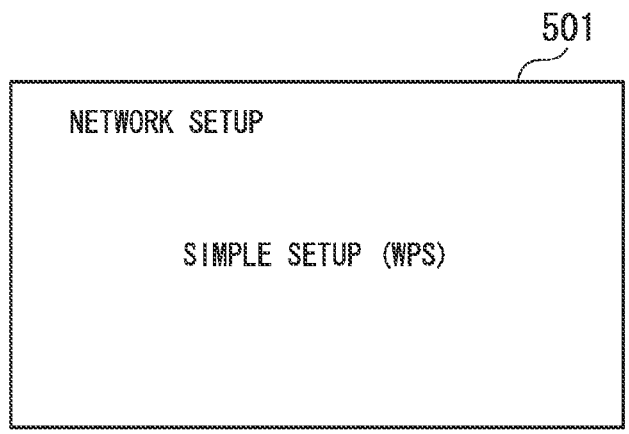
FIG. 5 is a reference diagram illustrating a screen when a network setup image is displayed in accordance with the first preferred embodiment of the present invention.

FIGS. 3 to 5 are reference diagrams illustrating screens of the digital camera 101 when content of network setup set in the memory card 102 is displayed in a state in which the memory card 102 is inserted into the memory card slot of the digital camera 101. Network setup information corresponding to network setup set in advance, for example, using the personal computer 105, is recorded in the setup recording unit 206 of the memory card 102, and the image generation unit 203 generates the image file based on the network setup information. FIG. 3 is a reference diagram illustrating a screen for an image playback mode. The image generated by the image generation unit 203 is displayed in a general screen for an image playback mode of the digital camera 101 as shown in FIG. 3.

FIG. 4 is a reference diagram illustrating a screen when a network setup image 401 generated based on the network setup information already recorded in the memory card 102 is displayed in an image playback mode. Further, FIG. 5 is a reference diagram illustrating a screen when a network setup image 501 indicating simple setup that is simply performed is displayed in an image playback mode without a user performing complex input for network setup.

Information such as "network name," "network authentication," "data encryption," "passphrase," and "state" is described in the network setup image 401 based on the network setup information recorded in the memory card 102. Information indicating "simple setup" is also described in the network setup image 501.

Here, the simple setup refers to setup in which the devices, when performing wireless communication with each other, perform communication in advance to exchange necessary information and automatically perform network setup based on the exchanged information, without the user inputting information for network setup in advance in order to overcome the inconvenience for the user of normally inputting the information for network setup in advance to perform wireless communication.

After the network setup image 401 and the network setup image 501 are displayed, the user selects a network desired for connection through any action so that the network setup is performed and the memory card 102 performs desired wireless communication. Further, an image generation method and a network selection method will be described in detail later.

Relationship Between Network Setup Information and Network Setup Image

FIG. 6 is a reference diagram illustrating the network setup information recorded in the setup recording unit 206 of the memory card 102. The network setup information includes a network name 601, a network authentication scheme 602, a data encryption scheme 603, a passphrase 604, a connection priority 605, an image identifier 606, and selection information 607.

The network name 601 refers to a name (SSID) for identifying a built network. The network authentication scheme 602 indicates a type (e.g., open/shared) of a security authentication scheme of the network. The data encryption scheme 603 indicates a type of an encryption scheme. The passphrase 604 indicates identification information used for encryption. The connection priority 605 indicates a communication setup priority assigned for identification when a plurality of pieces of network setup information are recorded. The image identifier 606 indicates an identifier for identifying the network setup information and an image file linked to the network setup information. The selection information 607 refers to network setup selected by a user.

FIG. 7 is a reference diagram illustrating details of the network setup information in accordance with the first preferred embodiment of the present invention. In the memory card 102, a plurality of pieces of network setup information may be recorded, as shown in a network setup information group 711. Values are set according to the respective setup items described in FIG. 6, as shown in network setup information 701 to 703. Each of the pieces of network setup information 701 to 703 is information for connection to one network.

Figure 8:
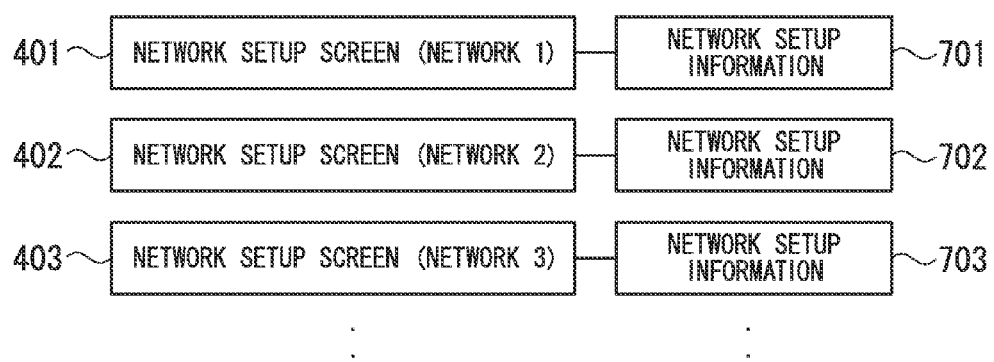
FIG. 8 is a reference diagram illustrating a link between the network setup image and the network setup information in accordance with the first preferred embodiment of the present invention.

FIG. 8 is a reference diagram illustrating a link between the network setup image and the network setup information in accordance with the first preferred embodiment of the present invention. As shown in FIG. 8, a link (association) is maintained such that the network setup image 401 is linked to the network setup information 701 and the network setup image 402 is linked to the network setup information 702. In fact, a file name is assigned to each network setup image and associated with an image identifier 606 of an item in the network setup information. Thus, the network setup information and the network setup image are recorded in the memory card 102 in an associated state.

Input of Network Setup Value Using Personal Computer

Figure 9:
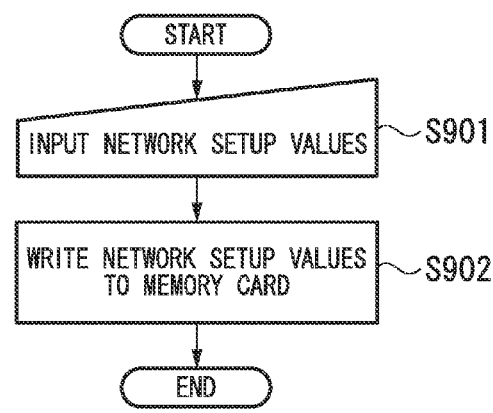
FIG. 9 is a flowchart illustrating a procedure of a process when network setup is performed by a personal computer in accordance with the first preferred embodiment of the present invention.

Even in a state in which there is no network setup information in the memory card, the memory card 102 may perform network setup using a method such as the above-described simple setup, but the network setup may be performed on the memory card 102 using software installed in the personal computer 105. FIG. 9 is a flowchart illustrating a procedure of a process when network setup is performed by a personal computer in accordance with the first preferred embodiment of the present invention.

First, the user activates the software installed in the personal computer 105 and inputs respective network setup values (step S901). The respective network setup values are "network name," "network authentication scheme," "data encryption scheme," and "passphrase" described with reference to FIG. 6. Further, the user inputs a "connection priority" of the network.

After each network setup item is input, the personal computer 105 writes the input network setup values to the memory card 102 (step S902). In this case, in the memory card 102, the network setup values are input to the interface unit 201, and the memory control unit 202 records the network setup values input to the interface unit 201 in the setup recording unit 206. In this case, the data written to the memory card 102 is added to the network setup information group described with reference to FIG. 7.

Further, the memory card 102 is assumed to be inserted into the memory card slot included in the personal computer 105 and the software necessary for network setup is assumed to be installed in the personal computer 105 in advance.

Operation after Memory Card is Inserted Into Digital Camera

Figure 10:
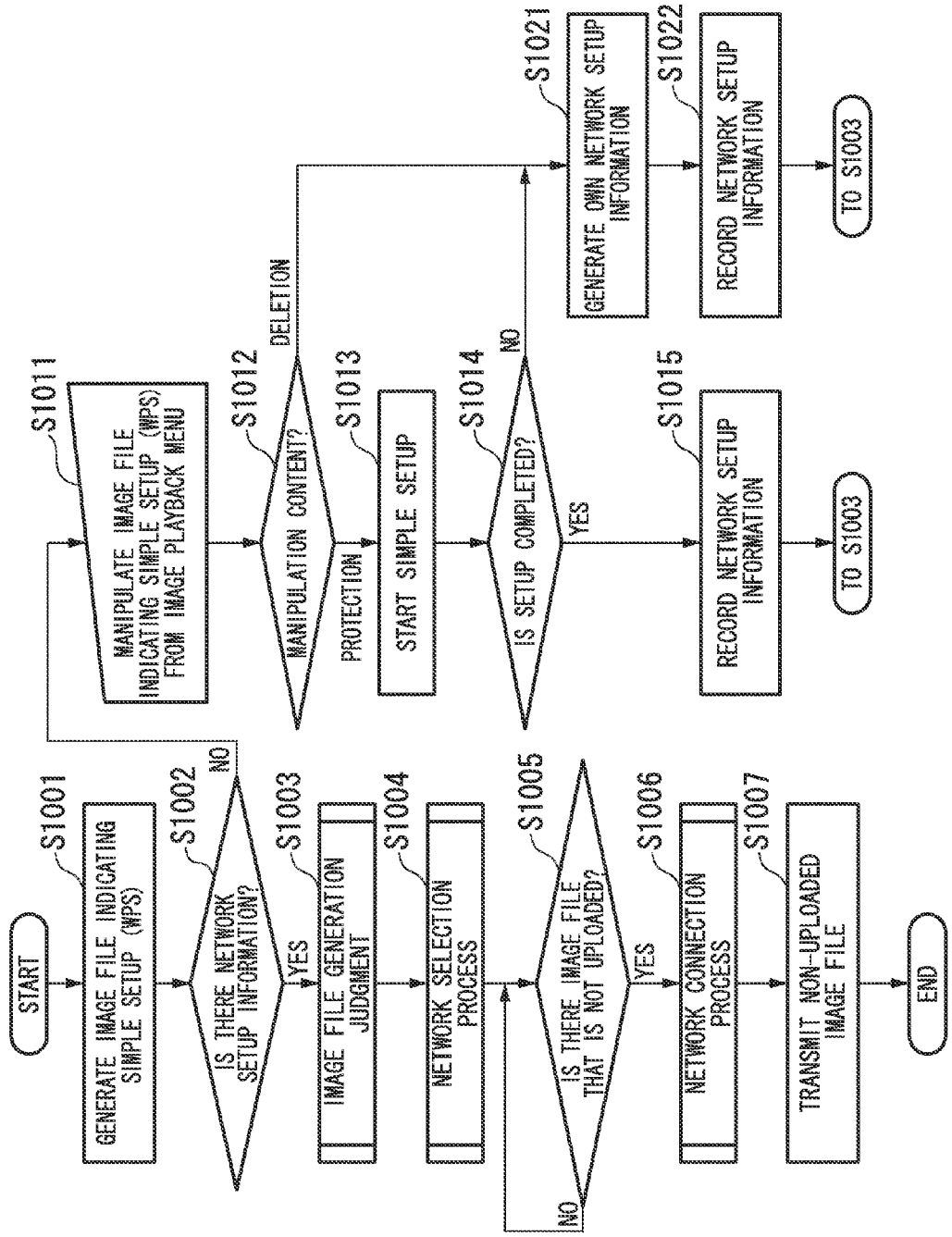
FIG. 10 is a flowchart illustrating a procedure of operation of a memory card in accordance with the first preferred embodiment of the present invention.
Figure 11:
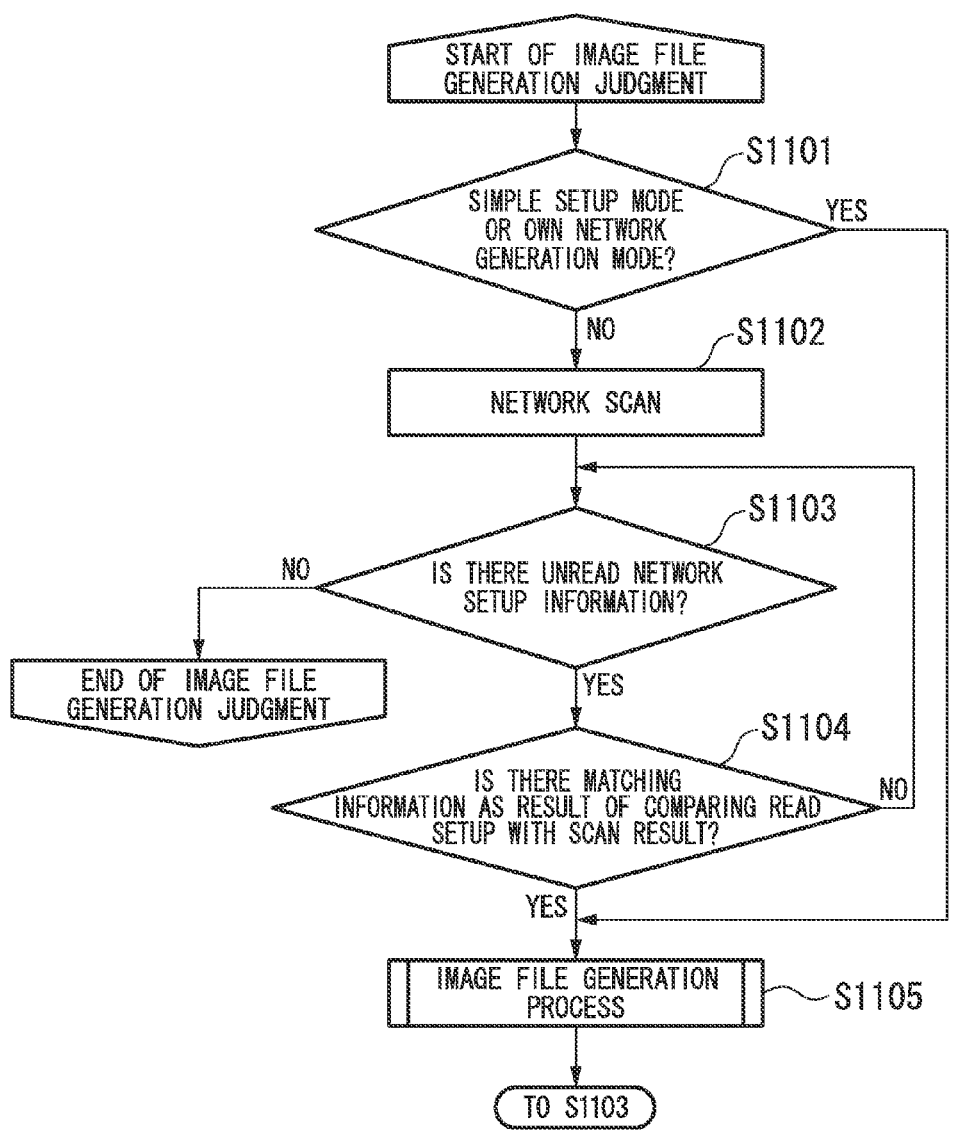
FIG. 11 is a flowchart illustrating a procedure of operation of a memory card in accordance with the first preferred embodiment of the present invention.
Figure 12:
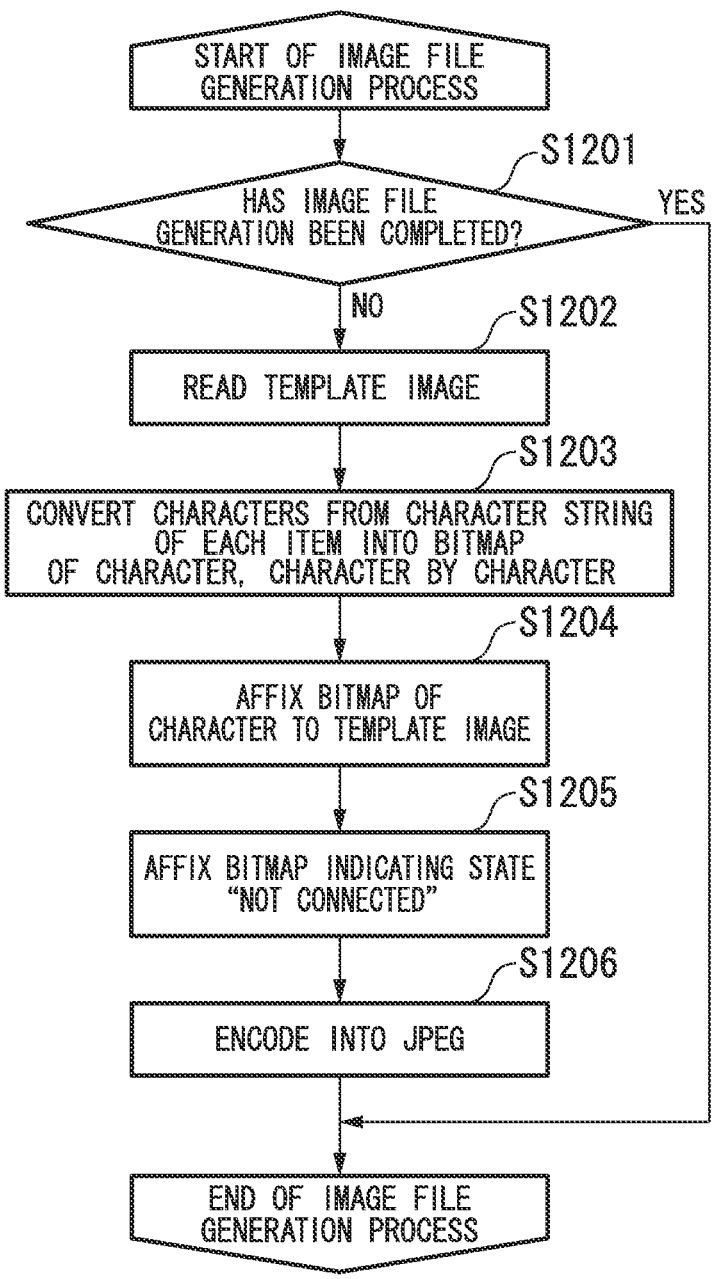
FIG. 12 is a flowchart illustrating a procedure of operation of a memory card in accordance with the first preferred embodiment of the present invention.

FIGS. 10 to 12 are flowcharts illustrating a procedure of operation of a memory card in accordance with the first preferred embodiment of the present invention. Operation after the memory card 102 is inserted into the memory card slot 106 of the digital camera 101 and the digital camera 101 is powered on will be described with reference to FIG. 10.

When the digital camera 101 is powered on, power begins to be supplied to the memory card 102. At this time, the memory control unit 202 causes the image generation unit 203 to generate an image file indicating simple setup (step S1001). In this case, a method in which an image file is prepared in the setup recording unit 206 in advance, for example, as an image in a JPEG format, and the image file may be copied to the memory unit 205 at that time may be used.

Subsequently, the memory control unit 202 performs a judgment as to whether there is network setup information in the setup recording unit 206 (step S1002). If there is network setup information, the memory card 102 makes an image file generation judgment to judge whether to generate an image file for identifying network setup information (step S1003).

Hereinafter, the image file generation judgment in step S1003 will be described with reference to FIG. 11. First, the memory control unit 202 judges whether the process is invoked in a simple setup mode (a mode via step S1011 in FIG. 10) or an own network generation mode (mode via step S1021 in FIG. 10) (step S1101). Since the operation mode is not the simple setup mode or the own network generation mode when the network setup information has already been recorded in the memory card 102, the memory control unit 202 controls the communication control unit 204 and performs a network scan (step S1102).

If a wireless LAN is used, the memory card 102 transmits a probe request that is an IEEE802.11 management frame and waits for a probe response to be received from another terminal. In the first preferred embodiment, the probe response is reported as a response from a wireless device such as the access point 103 in FIG. 1. Information on "network name," "network authentication scheme" and "data encryption scheme" is contained in the probe response.

The memory control unit 202 then reads the network setup information recorded in the setup recording unit 206 (step S1103). The information read herein is information such as the network setup information 701 described using FIG. 7. If there is unread network setup information, the memory control unit 202 reads the network setup information, and compares the read network setup information with the content of the response sent back by the network scan (step S1104). The memory control Unit 202 reads the network setup information once one set at a time by sequentially reading the network setup information from the setup recording unit 206 and sequentially performing the comparison in step S1104.

The memory control unit 202 compares the network setup information with the content of the response for "network name," "network authentication scheme," and "data encryption scheme," and reads next network setup information recorded in the memory card 102 if there is non-matching information (step S1103).

On the other hand, if all including "network name" match each other as a result of the comparison, the memory control unit 202 causes the image generation unit 203 to generate the network setup image 401 described using FIG. 4 based on the network setup information (step S1105). Further, the memory control unit 202 reads the network setup information (step S1103), and if there is no network setup information not yet read, the memory control unit 202 ends the process.

Hereinafter, the image file generation process in step S1105 will be described using FIG. 12.

First, the memory control unit 202 performs a judgment as to whether an image file indicating network setup information coinciding with a result of the network scan in step S1103 is recorded in the memory unit 205, that is, whether the image file has already been generated (step S1201). If the image file has already been generated, the image file generation process ends.

Figure 13:
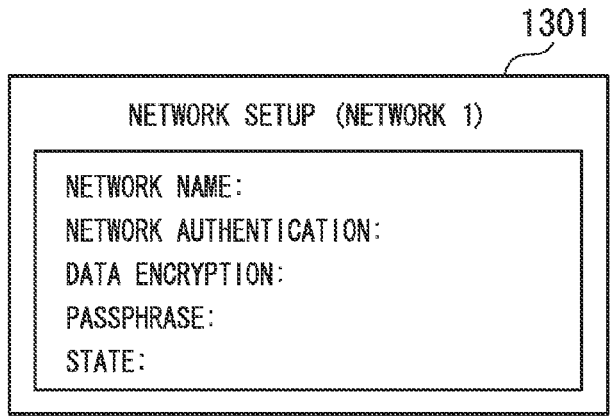
FIG. 13 is a reference diagram illustrating a template image in accordance with the first preferred embodiment of the present invention.

If the image file has not been generated, the memory control unit 202 causes the image generation unit 203 to perform the following process. The image generation unit 203 reads a template image from the setup recording unit 206 (step S1202). FIG. 13 is a reference diagram illustrating a template image in accordance with the first preferred embodiment of the present invention. The template image is a bitmap image in which necessary items have been converted into image files in advance, like a template 1301 shown in FIG. 13.

Figure 14:
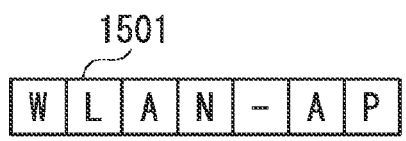
FIG. 14 is a reference diagram illustrating a bitmap font in accordance with the first preferred embodiment of the present invention.

FIG. 14 is a reference diagram illustrating a bitmap font in accordance with the first preferred embodiment of the present invention. Following step S1202, the image generation unit 203 discovers a character corresponding to the bitmap font 1401 shown in FIG. 14 character by character for a character string (e.g., for a network name, a character string "WLAN-AP") described in each item of the network setup information 701, and converts each character into the bitmap font in order (step S1203).

Figure 15:
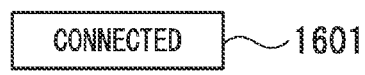
FIG. 15 is a reference diagram illustrating a state in which bitmap fonts are arranged in accordance with the first preferred embodiment of the present invention.

FIG. 15 is a reference diagram illustrating a state in which bitmap fonts are arranged in accordance with the first preferred embodiment of the present invention. The image generation unit 203 arranges and affixes the converted bitmap fonts to given positions of the template 1301 so that a character string such as the network name 1501 shown in FIG. 15 is obtained. The position on the template 1301 to which the character string is affixed is determined in advance. For the network name, a coordinate (0, 0) of the network name 1501 matches a coordinate (120, 20) on the image of the template 1301 so that the character string is affixed.

Figure 16:
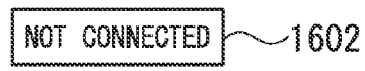
FIG. 16 is a reference diagram illustrating a bitmap indicating a network connection state in accordance with the first preferred embodiment of the present invention.

The image generation unit 203 generates the character string represented by the bitmap fonts from the network setup information for each item using the above method and affixes the character string. Finally, the image generation unit 203 affixes a "not connected" bitmap as a character string indicating a current network connection state to a given position of the template 1301 (step S1206). FIG. 16 is a reference diagram illustrating a bitmap indicating a network connection state in accordance with the first preferred embodiment of the present invention. For the bitmap indicating a network connection state, a template including a bitmap 1601 indicating "connected" and a bitmap 1602 indicating "not connected" shown in FIG. 16 has been recorded in the setup recording unit 206 in advance, similar to the template 1301

Through this process, the network setup image 401 shown in FIG. 14 is generated. The memory control unit 202 encodes the generated network setup image into a JPEG format and records the resultant network setup image in the memory unit 205 (step S1206). Through this process, the image file corresponding to the network setup information can be generated.

Hereinafter, the description of the process shown in FIG. 11 will continue. After the generation of the image file corresponding to the network setup information is completed, the memory control unit 202 reads next network setup information recorded in the memory card 102 (step S1103). If reading of all network setup information is completed, the memory control unit 202 ends the image file generation judgment.

If the image file generation judgment is made in the simple setup mode or the own network generation mode, the memory control unit 202 performs the image file generation process without performing the network scan (step S1105).

If the network setup information has been recorded in the memory card 102, in the first preferred embodiment, a network scan is performed to detect a network to which the memory card 102 can connect, and the network setup information recorded in the memory card 102 is compared with the result of the network scan. However, image files for all network setup information recorded in the memory card 102 may be generated without performing the network scan and the comparison.

Hereinafter, the description of the process shown in FIG. 10 is continued. The memory control unit 202 performs a network selection process to determine a network as a connection destination from among networks indicated by the network setup information recorded in the setup recording unit 206 (step S1004). In order to select a user-desired network from among the networks indicated by the network setup information recorded in the memory card 102, normally, it is necessary to provide a network selection menu in the digital camera 101. In the first preferred embodiment, as methods of selecting a network without providing such a dedicated network selection menu, three methods are provided and will be described herein.

Network Selection Method 1: Protection Information is Assigned to Image File Indicating Network to Which User Desires to Connect FIGS. 17 to 21 are flowcharts illustrating a procedure of operation of a memory card in accordance with the first preferred embodiment of the present invention. A first method of selecting a network desired for connection by a user will be described with reference to FIG. 17.

First, the digital camera 101 displays an image based on the image file recorded in the memory card 102 according to an instruction from the user in the photograph playback mode (step S1701). In this case, through a user manipulation, instruction information indicating a display instruction for the image file is input to the memory card 102 via the interface unit 201. The memory control unit 202 selects an image file used for image display from among the image files stored in the memory unit 205 based on the instruction information input to the interface unit 201, and outputs the image file to the digital camera 101 via the interface unit 201.

When the network setup image file is used for display (step S1702), the user assigns protection information if the network setup image file is a network setup image file indicating a network to which the user desires to connect, and performs a manipulation to release the protection information if the network setup image file is a network setup image file indicating a network to which the user does not desire to connect, using a general photograph protection function of the digital camera 101. Through this manipulation, instruction information indicating an instruction to assign the protection information to the network setup image file or to release the protection information is input to the memory card 102 via the interface unit 201 (step S1703).

The memory control unit 202 assigns information indicating a protection state (protect/not protect) to the network setup image file stored in the memory unit 205 based on the instruction information input to the interface unit 201 (step S1704). Further, the memory control unit 202 records selection information 607 indicating that network setup corresponding to the network setup image file is used, in the network setup information in the setup recording unit 206, in order to set, in the memory card 102, network setup associated with the network setup image file as a manipulation target based on the instruction information (step S1705).

If the image display is continued (step S1706), the digital camera 101 displays a next image in step S1701, and if the digital camera 101 ends the image display (step S1707), the network selection process ends. Further, the image file to which the protection information is assigned has been assumed to be only one, but there is no such limit when a network is selected based on information of the connection priority 605.

Network Selection Method 2: Image Files Indicating Networks to Which Connection is Not Made are All Deleted A second method of selecting a network desired for connection by a user will be described with reference to FIG. 18.

First, the digital camera 101 displays an image based on the image file recorded in the memory card 102 according to an instruction from the user in a photograph playback mode (step S1801). In this case, through a user manipulation, instruction information indicating an instruction for display of the image file is input to the memory card 102 via the interface unit 201. The memory control unit 202 selects an image file used for image display from among the image files stored in the memory unit 205 based on the instruction information input to the interface unit 201, and outputs the image file to the digital camera 101 via the interface unit 201.

When the network setup image file is used for display (step S1802), the user judges whether the network setup image 401 corresponds to a network to which the user desires to connect, and then, if the network setup image 401 does not correspond to the network to which the user desires to connect, the user performs a manipulation to delete a network setup image file corresponding to the displayed network setup image 401 using a general photograph deletion function of the digital camera 101. Through this manipulation, instruction information indicating a deletion instruction for the network setup image file is input to the memory card 102 via the interface unit 201 (step S1803).

The memory control unit 202 deletes the network setup image file stored in the memory unit 205 based on the instruction information input to the interface unit 201 (step S1804).

When the image display is continued (step S1805), the digital camera 101 displays a next image in step S1801 and ends the image display (step S1805), and the memory control unit 202 detects the network setup image file from among the image files stored in the memory unit 205 (step S1806).

The memory control unit 202 records selection information 607 indicating that network setup corresponding to the detected network setup image file is used, in the network setup information in the setup recording unit 206 (step S1807). Through this process, the network selection process ends.

Network Selection Method 3: Last Displayed Image File is Assumed to be Selected

A third method of selecting a network desired for connection by a user will be described with reference to FIG. 19.

First, the digital camera 101 in the photograph playback mode displays the image based on the image file recorded in the memory card 102 according to an instruction from the user (step S1901). In this case, instruction information indicating a display instruction for the image file is input to the memory card 102 via the interface unit 201 by the user manipulation. The memory control unit 202 selects an image file used for image display from among the image files stored in the memory unit 205 based on the instruction information input to the interface unit 201, and outputs the image file to the digital camera 101 via the interface unit 201.

When the image display is continued (step S1902), the digital camera 101 displays a next image in step S1901. If the image display ends (step S1902), the memory control unit 202 detects an image file corresponding to the last displayed image from among the image files stored in the memory unit 205 (step S1903).

If the image file last used for display is the network setup image file (step S1904), the memory control unit 202 records selection information 607 indicating that a network setup corresponding to the detected network setup image file is used, in the network setup information in the setup recording unit 206 (step S1905). Through this process, the network selection process ends.

Figure 17:
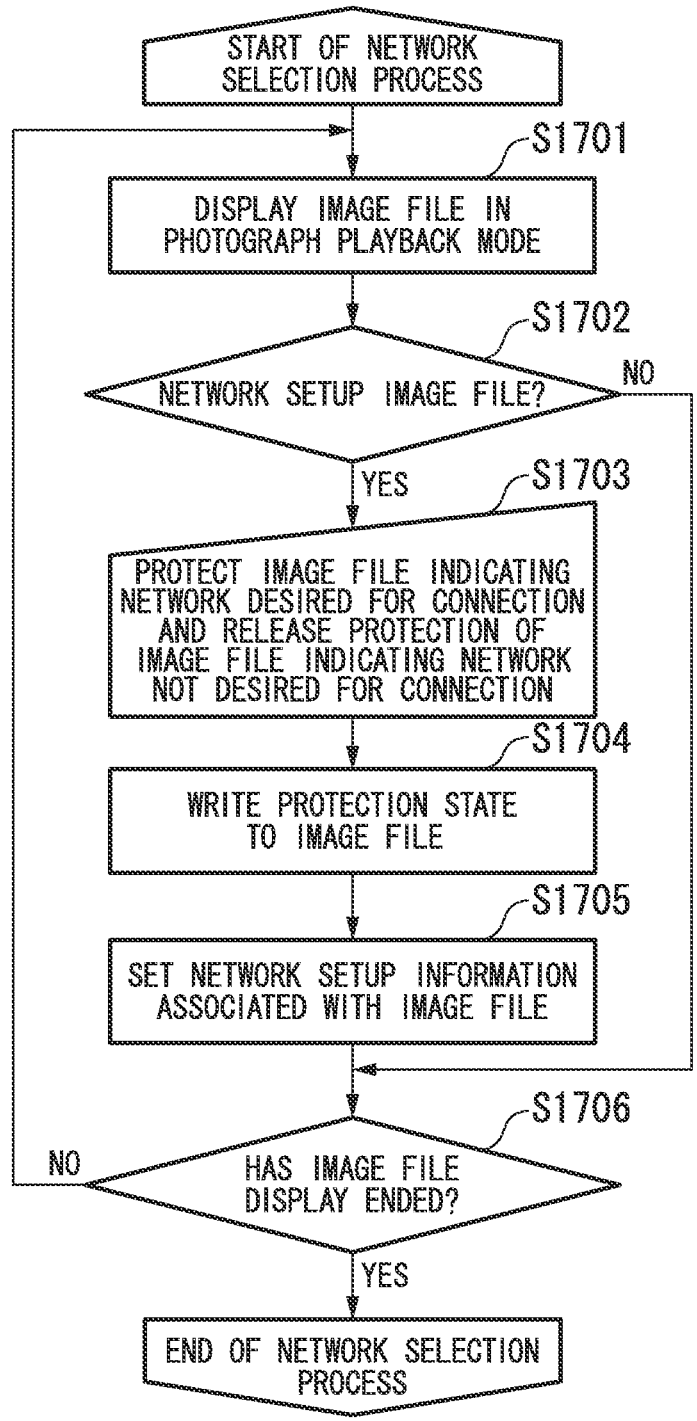
FIG. 17 is a flowchart illustrating a procedure of operation of a memory card in accordance with the first preferred embodiment of the present invention.
Figure 18:
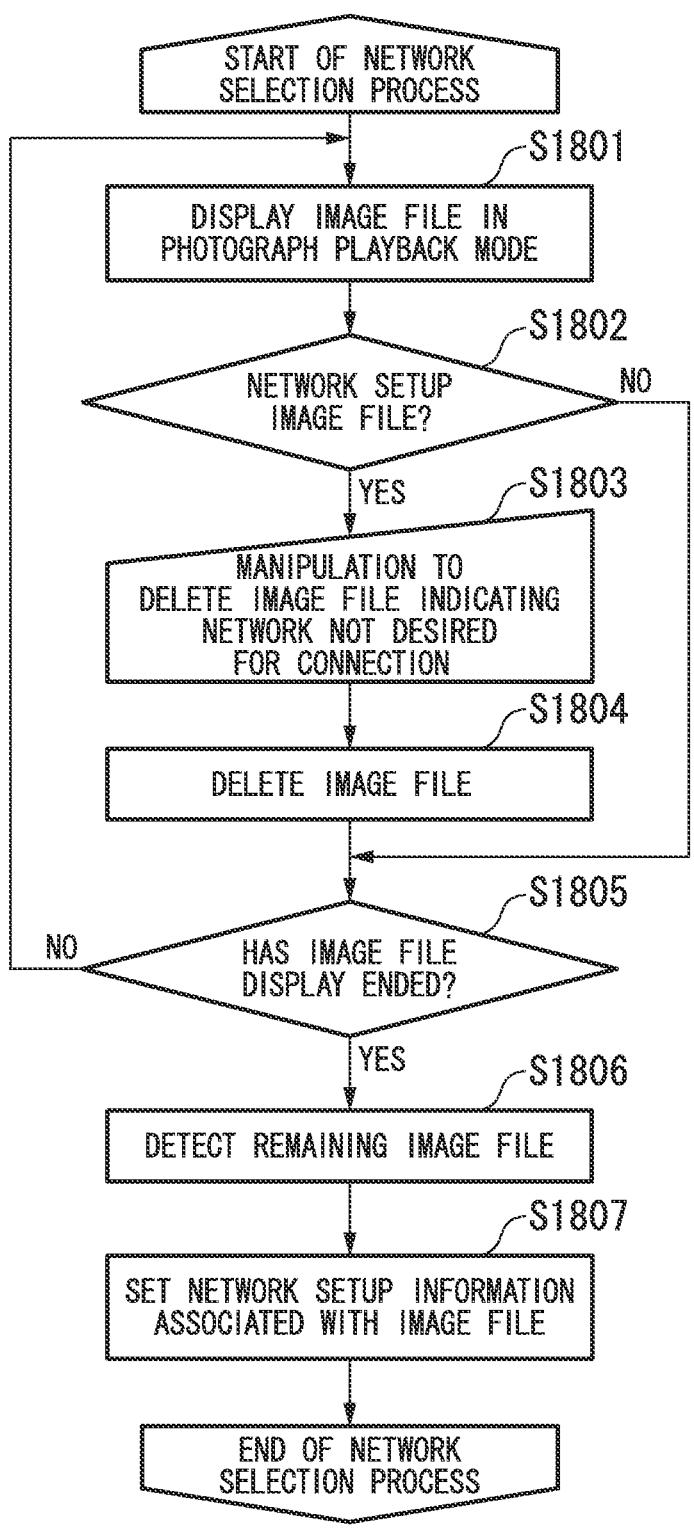
FIG. 18 is a flowchart illustrating a procedure of operation of a memory card in accordance with the first preferred embodiment of the present invention.
Figure 19:
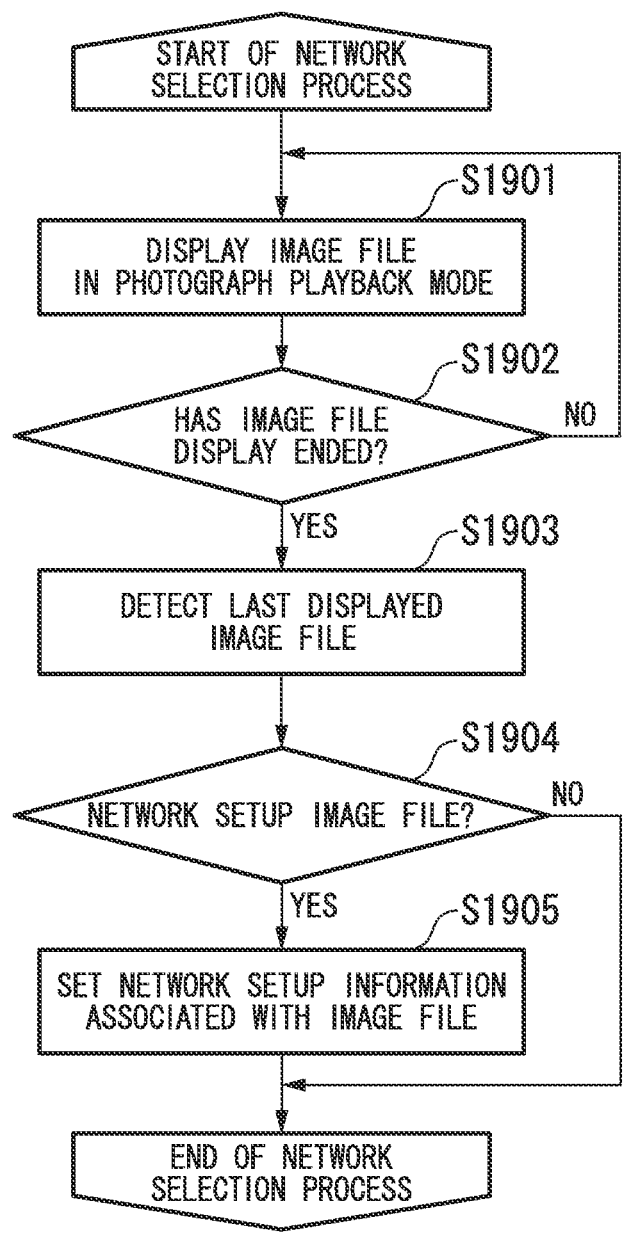
FIG. 19 is a flowchart illustrating a procedure of operation of a memory card in accordance with the first preferred embodiment of the present invention.

Through the process shown in FIGS. 17 through 19, network setup information corresponding to a network desired for connection by a user can be selected from among the network setup information recorded in the memory card 102 using an existing user interface even when the digital camera 101 does not include a particular user interface.

Hereinafter, the description of the process shown in FIG. 10 will continue. After the network selection process (step S1004) ends, the memory control unit 202 detects whether there is an image file that is not uploaded to the storage device 104 or the personal computer 105 among the image files recorded in the memory unit 205 (step S1005).

If there is no image file that is not uploaded, the memory card 102 continues to monitor whether there is an image file that is not uploaded while polling. For example, if the digital camera 101 performs photographing during polling, photograph data is written to the memory card 102 and recorded in the memory unit 205, and accordingly, the memory card 102 detects the photograph data. If the memory control unit 202 detects the non-uploaded image file, the memory control unit 202 outputs a network connection command to the communication control unit 204. The communication control unit 204 controls the communication unit 207 based on the network connection command and performs a network connection (step S1006).

Network Connection Process

Figure 20:
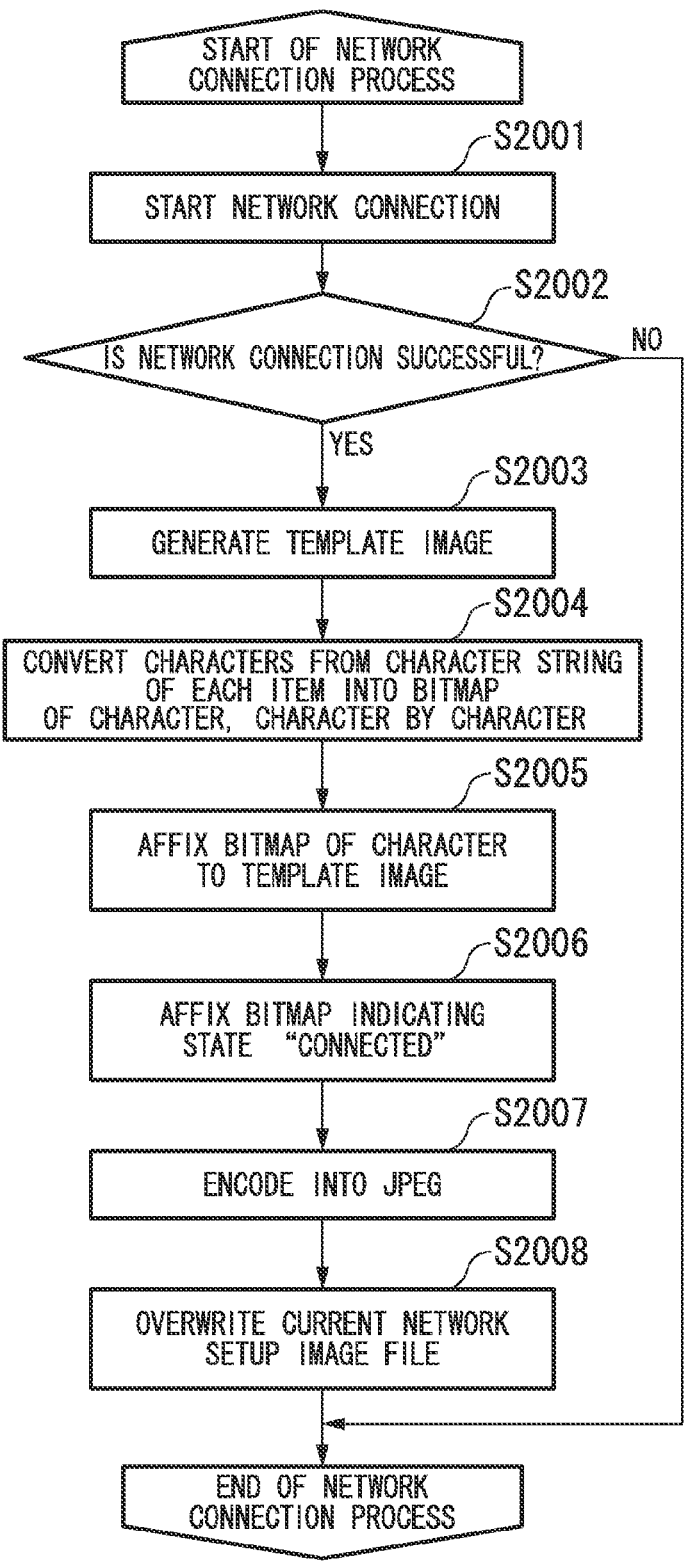
FIG. 20 is a flowchart illustrating a procedure of operation of a memory card in accordance with the first preferred embodiment of the present invention.
Figure 21:
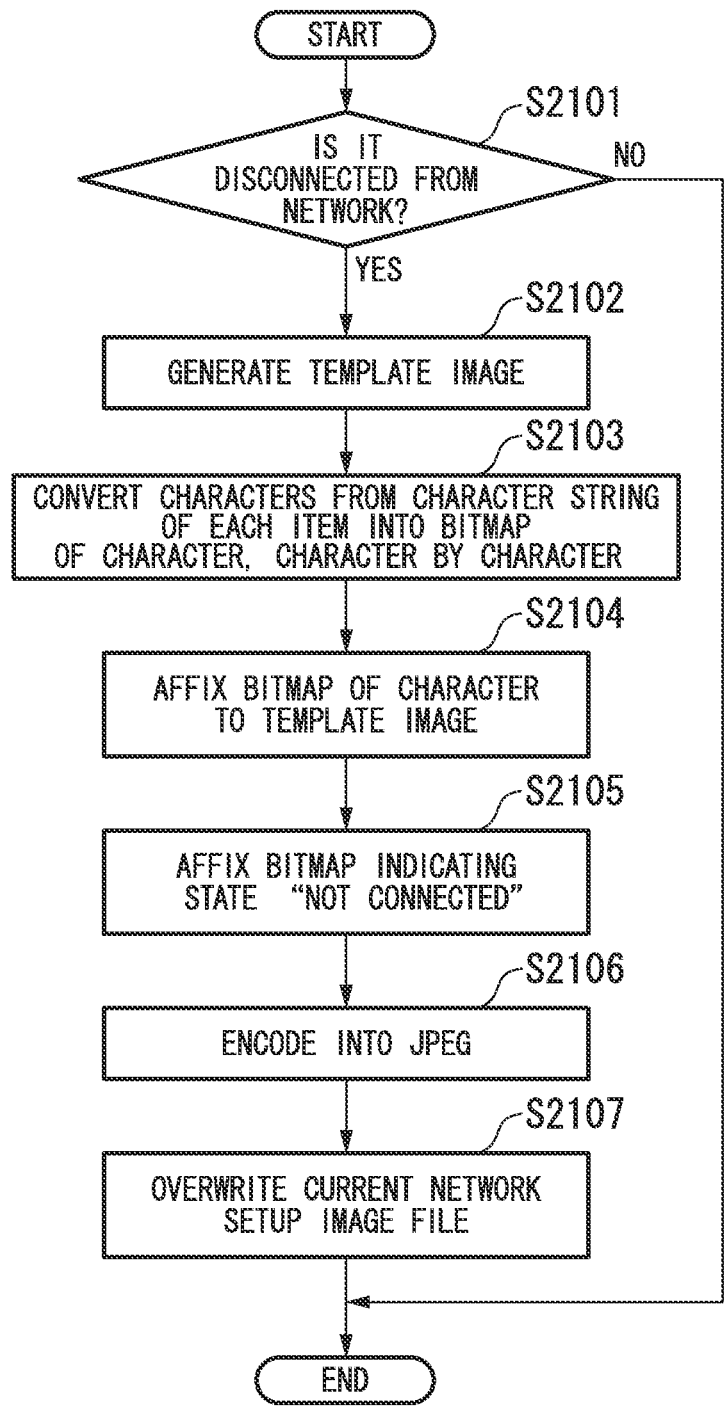
FIG. 21 is a flowchart illustrating a procedure of operation of a memory card in accordance with the first preferred embodiment of the present invention.

Hereinafter, the network connection process will be described with reference to FIG. 20. The communication control unit 204 reads network setup information to which the selection information 607 shown in FIG. 6 is assigned among the network setup information recorded in the setup recording unit 206, performs setup necessary for the communication unit 207 according to the read network setup information, and starts the network connection (step S2001).

After the network connection process is performed, the communication control unit 204 judges a network connection state (step S2002). If the network connection fails, the network connection process ends. Further, if the network connection fails, the process may return to the network connection initiation process (step S2001) and attempt the connection again.

If the network connection is successful, the communication control unit 204 performs a notification to the memory control unit 202. After receiving the notification, the memory control unit 202 causes the image generation unit 203 to perform the following process. The image generation unit 203 first generates the template 1301 described using FIG. 13 (step S2003).

Subsequently, the image generation unit 203 converts a character string of each item of the network setup information into a bitmap font character by character, as described in the image file generation process in FIG. 12 (step S2004). The image generation unit 203 affixes the converted bitmap font to a given position of the template 1301, similar to the method described in the image file generation process in FIG. 12 (step S2005).

The image generation unit 203 also affixes the bitmap 1601 indicating "connected" described with reference to FIG. 16, as information indicating the connection state, to a given position of the template 1301 (step S2006). The image generation unit 203 converts the generated bitmap image into a JPEG format (step S2007).

Finally, the image generation unit 203 overwrites a network setup image file corresponding to the network setup information used for network connection among the network setup image files stored in the memory unit 205, on the generated file (step S2008). Through this process, the network connection can be performed and the network setup image file in which the connection state has been updated can be generated.

Transmission of Non-Uploaded Photograph

Hereinafter, the description of the process shown in FIG. 10 will continue. After the network connection, the memory card 102 can use the network. The communication control unit 204 controls the communication unit 207 and transmits the non-uploaded image file recorded in the memory unit 205 to the storage device 104 and the personal computer 105, for example, via the access point 103 (step S1007). Through this process, the user can select network setup information corresponding to a desired network from among the network setup information recorded in the memory card 102, and transmit the image file to an external device such as the storage device 104 or the personal computer 105.

Network Disconnection Process

After the transmission of the non-uploaded image to the storage device 104 or the personal computer 105 is completed, the memory card 102 disconnects from the network to which the memory card 102 has been connected. Hereinafter, a network disconnection process will be described with reference to FIG. 21.

The memory control unit 202 monitors an upload state and judges whether transmission of all non-uploaded image files has been completed, that is, whether the memory card 102 is allowed to disconnect from the network (step S2101). If the image file is being transmitted or there is an image file that has not been up-loaded, then the memory card 102 does not disconnect from the network.

If the transmission of all the non-uploaded image files is completed, the memory control unit 202 causes the image generation unit 203 to perform the following process. The image generation unit 203 first generates the template 1301 described using FIG. 13 (step S2102).

Subsequently, the image generation unit 203 converts a character string of each item of the network setup information into a bitmap font character by character, as described in the image file generation process in FIG. 12 (step S2103). The image generation unit 203 affixes the converted bitmap font to a given position of the template 1301, similar to the method described in the image file generation process in FIG. 12 (step S2104).

Furthermore, the image generation unit 203 affixes the bitmap 1602 indicating "not connected" described with reference to FIG. 16, as the information indicating the connection state, to a given position of the template 1301 (step S2105). The image generation unit 203 converts the generated bitmap image to a JPEG format (step S2106).

Finally, the image generation unit 203 overwrites a network setup image file corresponding to the network setup information used for network connection among the network setup image files stored in the memory unit 205, on the generated file (step S2107). Through this process, the network connection can be performed and the network setup image file in which the connection state has been updated can be generated.

When Network Setup Information is Not Originally Recorded in Memory Card

Hereinafter, the description of the process shown in FIG. 10 will continue. There may be cases in which the memory card 102 is newly purchased or there is no apparatus (e.g., personal computer 105) for recording network setup information in the memory card 102. A description of such cases will be given as follows.

If it is judged in step S1002 that there is no network setup information in the setup recording unit 206, the user manipulates a menu in an image playback mode so that the network setup image 501 in FIG. 5 first generated by the memory card 102 is displayed, and performs a manipulation on the network setup image 501 using a general function of the digital camera 101. Through this manipulation, instruction information indicating an instruction for a given manipulation for the network setup image file is input to the memory card 102 via the interface unit 201 (step S1011).

The memory control unit 202 judges content of the manipulation for the network setup image file based on the instruction information input to the interface unit 201 (step S1012). When the user has performed a manipulation to assign protection information to the network setup image file, the memory control unit 202 initiates a simple setup function (step S1013). For the simple setup function, a generally known method is used. If such a method is used, the network setup information is exchanged between devices desiring to perform a network connection, and the network connection is performed.

If the network setup is completed by the simple setup (step S1014) and is successful, the memory control unit 202 records network setup information based on the setup content in the setup recording unit 206 (step S1015). Through this process, a connection to an unknown network can be made even in a state in which the network setup information is not recorded in the memory card 102.

In the above description, the case in which a network infrastructure is provided as an environment in which the digital camera 101 is used has been described. However, a user may desire to use a network in an environment in which a network infrastructure such as an access point is not provided. For example, there is a need for a transmission of an image file from the digital camera 101 to the personal computer 105, not via the access point 103.

Hereinafter, a method of performing a network connection in an environment in which a network infrastructure is not provided will be described with reference to FIG. 10. The user manipulates the menu in the image playback mode so that the network setup image 501 of FIG. 5 is displayed, and performs a deletion manipulation for deleting the image. In this case, the memory control unit 202 judges that a deletion manipulation for a network setup image file corresponding to the network setup image 501 has been performed (step S1012), and generates network setup information of its own network (step S1021). Even when network setup using the simple setup function fails, the memory control unit 202 generates the network setup information of its own network.

The own network refers to a network established by the memory card 102 itself. The memory control unit 202 generates the only network setup information in which network setup information of other networks is not duplicated, for example, using a MAC address that is device-specific information set upon factory shipment and recorded in the communication unit 207. Generated items are items described using FIG. 6. The memory control unit 202 records the generated network setup information in the setup recording unit 206 (step S1022). Through this process, the memory card 102 can establish a network even in a state in which the network setup information is not recorded in the memory card 102.

Assignment of Priority of Network Setup Using Personal Computer

Figure 22:
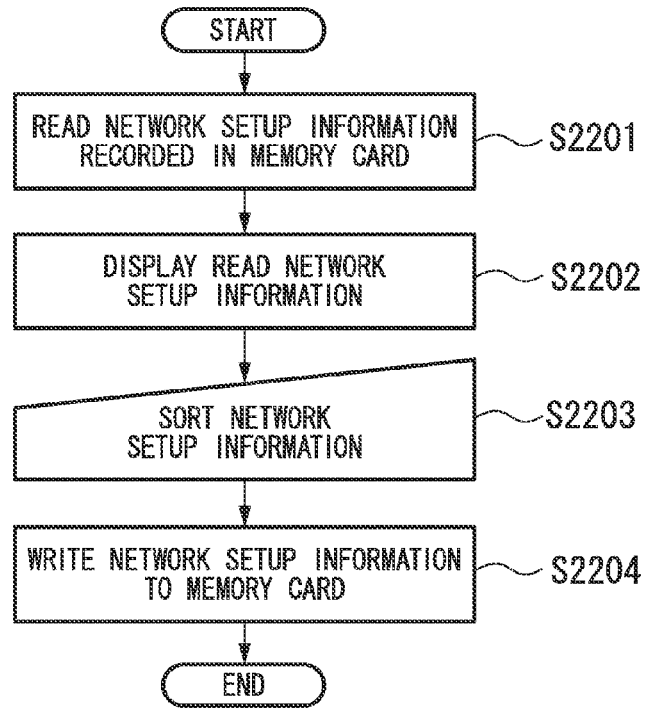
FIG. 22 is a flowchart illustrating a procedure of a process when network setup information is assigned a priority by a personal computer in accordance with the first preferred embodiment of the present invention.

A plurality of pieces of network setup information may be recorded in the memory card 102 and may be assigned priorities. FIG. 22 is a flowchart illustrating a procedure of a process when network setup information is assigned a priority by a personal computer in accordance with the first preferred embodiment of the present invention. Hereinafter, a method for assigning a priority will be described with reference to FIG. 22.

First, the user inserts the memory card 102 into the memory card slot of the personal computer 105 to activate software for performing network setup. The activated software reads the network setup information from the memory card 102 to the personal computer 105 (step S2201).

Subsequently, the software displays the read network setup information on a screen of the personal computer 105 (step S2202). The user performs a manipulation to sort the network setup information displayed on the screen in desired order of high connection priority (step S2203).

The software determines the priorities in order of the sorted network setup information, and records the information indicating the priorities in the memory card 102 (step S2204). The priorities are recorded as the connection priority 605 described using FIG. 6. For example, numbers indicating priorities, such as 1 to 3, are recorded, as shown in the respective network setup information of the network setup information group 711 in FIG. 7. Through this manipulation, the connection priority can be assigned to the network setup information.

Sorting of Network Setup Image Files According to Priorities

Figure 23:
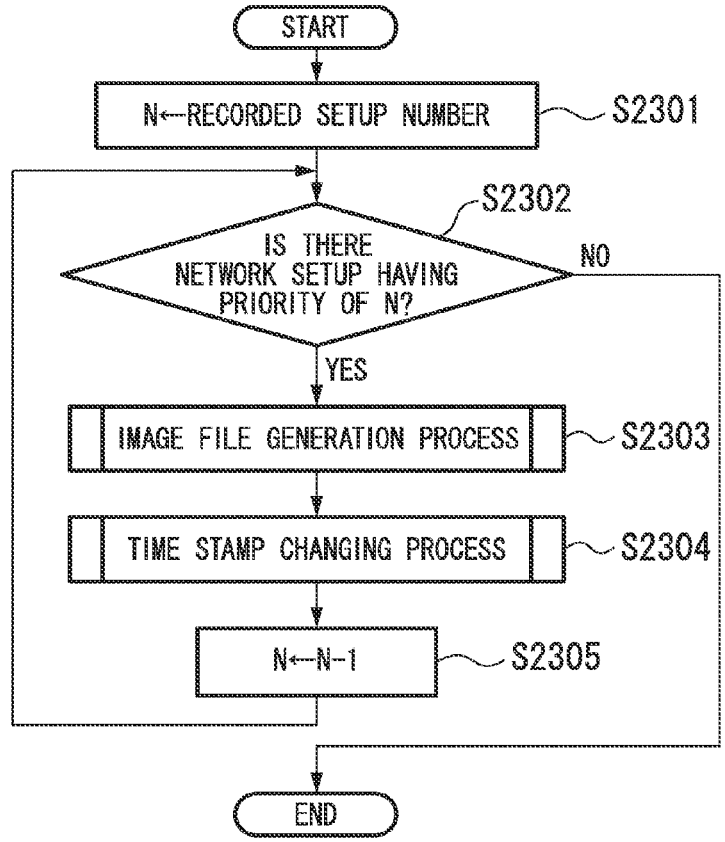
FIG. 23 is a flowchart illustrating procedures of operations of the memory card in accordance with the first preferred embodiment of the present invention.
Figure 24:
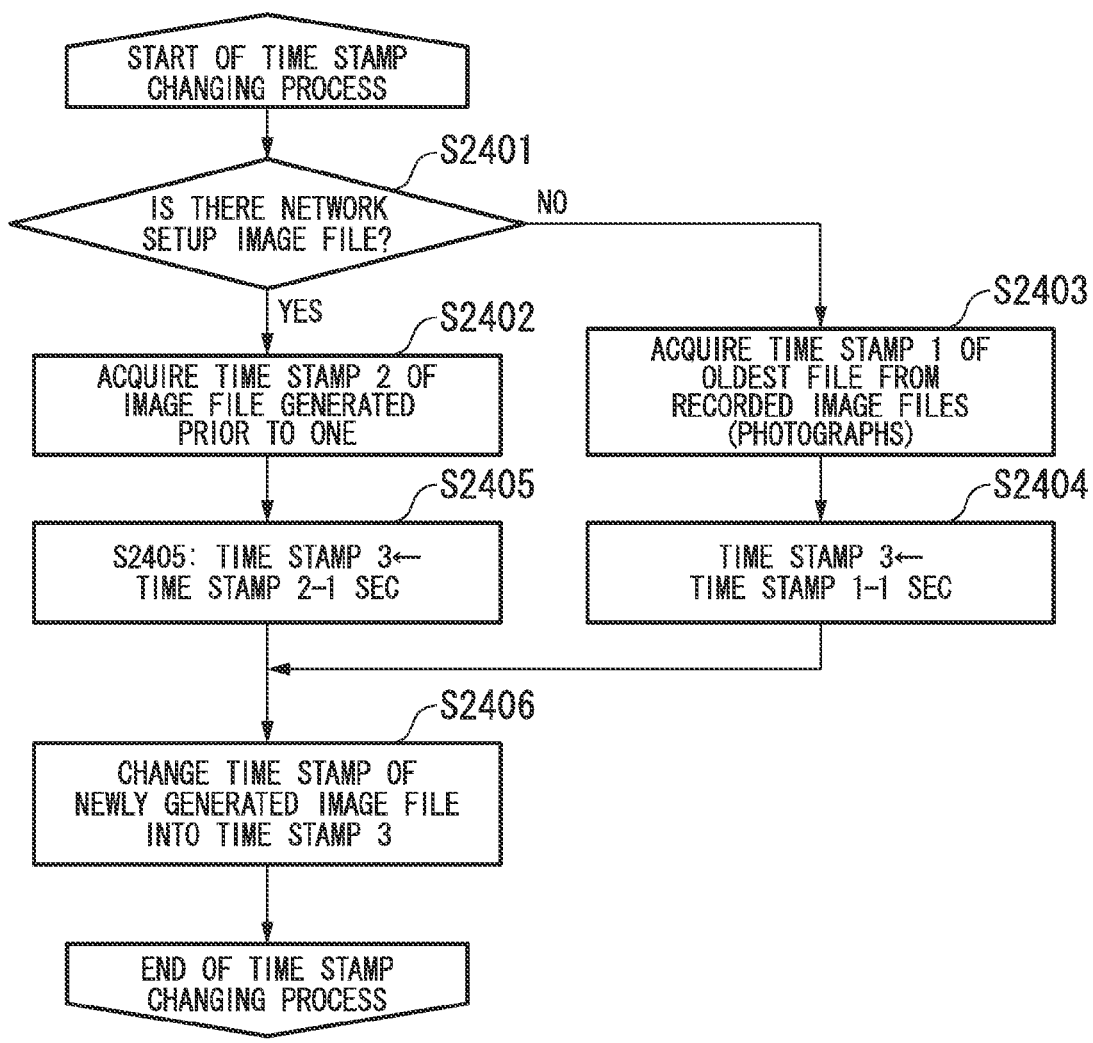
FIG. 24 is a flowchart illustrating procedures of operations of the memory card in accordance with the first preferred embodiment of the present invention.

FIGS. 23 and 24 are flowcharts illustrating procedures of operations of the memory card in accordance with the first preferred embodiment of the present invention. A method of displaying network setup image files in order of priorities in the photograph playback mode of the digital camera 101 according to the priorities of the network setup information described using FIG. 22 will be described with reference to FIG. 23.

The memory control unit 202 first acquires the number N of the network setup information recorded in the setup recording unit 206 (step S2301). Subsequently, the memory control unit 202 reads network setup information having a priority of N from the setup recording unit 206 (step S2302). If there is no network setup information having a priority of N, the process ends.

After reading the network setup information having a priority of N, the memory control unit 202 generates an image file (step S2303). A description of an image file generation method will be omitted herein since the image file generation method has been described using FIG. 12.

The memory control unit 202 then performs a process of adjusting the time stamp on the image file generated in the image file generation process (step S2304). Accordingly, image playback order in the photograph playback mode of the digital camera 101 is order of priorities and images can be displayed in order of priorities, thus improving user convenience. For example, since the network setup image is continuously displayed earlier than other images, the time and effort taken by the user to search for the network setup image can be reduced.

Hereinafter, a method of adjusting the time stamp will be described with reference to FIG. 24. The memory control unit 202 first checks if there is a network setup image file in the memory unit 205 (step S2401). If there is no network setup image file in the memory unit 205, the memory control unit 202 acquires the oldest time stamp 1 from among time stamps of respective image files recorded in the memory unit 205 (step S2403).

The memory control unit 202 generates a time stamp 3 according to the following equation (1) using the acquired time stamp 1 (step S2404).

(Calculation Equation) time stamp 3=time stamp 1−1 sec    (1)

The memory control unit 202 then changes the time stamp of the image file generated in step S2304 into the time stamp 3 (step S2406). If there is a network setup image file in the memory unit 205, the memory control unit 202 acquires a time stamp 2 of an image file (content data) generated prior to one (step S2402).

The memory control unit 202 generates the time stamp 3 according to the following equation 2 using the acquired time stamp 2 (step S2405).

(Calculation Equation) time stamp 3=time stamp 2−1 sec    (2)

The memory control unit 202 then changes the time stamp of the image file generated in step S2305 into the time stamp 3 (step S2406).

Hereinafter, the description of the process shown in FIG. 23 will continue. After the time stamp is changed, the memory control unit 202 decrements the value of the priority N by 1 (step S2305), and the process of reading the network setup information having priority N (step S2302) is iteratively performed until the value of N reaches 1. Through this process, the conversion into the image file is performed from network setup information having a high priority, and the network setup images can be continuously displayed in order of priorities earlier than the photograph image file recorded in the memory unit 205 of the memory card 102 using the photograph playback mode of the digital camera 101. In contrast to the above, the time stamps of the respective network setup image files may be set so that the network setup images are continuously displayed later than the photograph image file.

Figure 25:
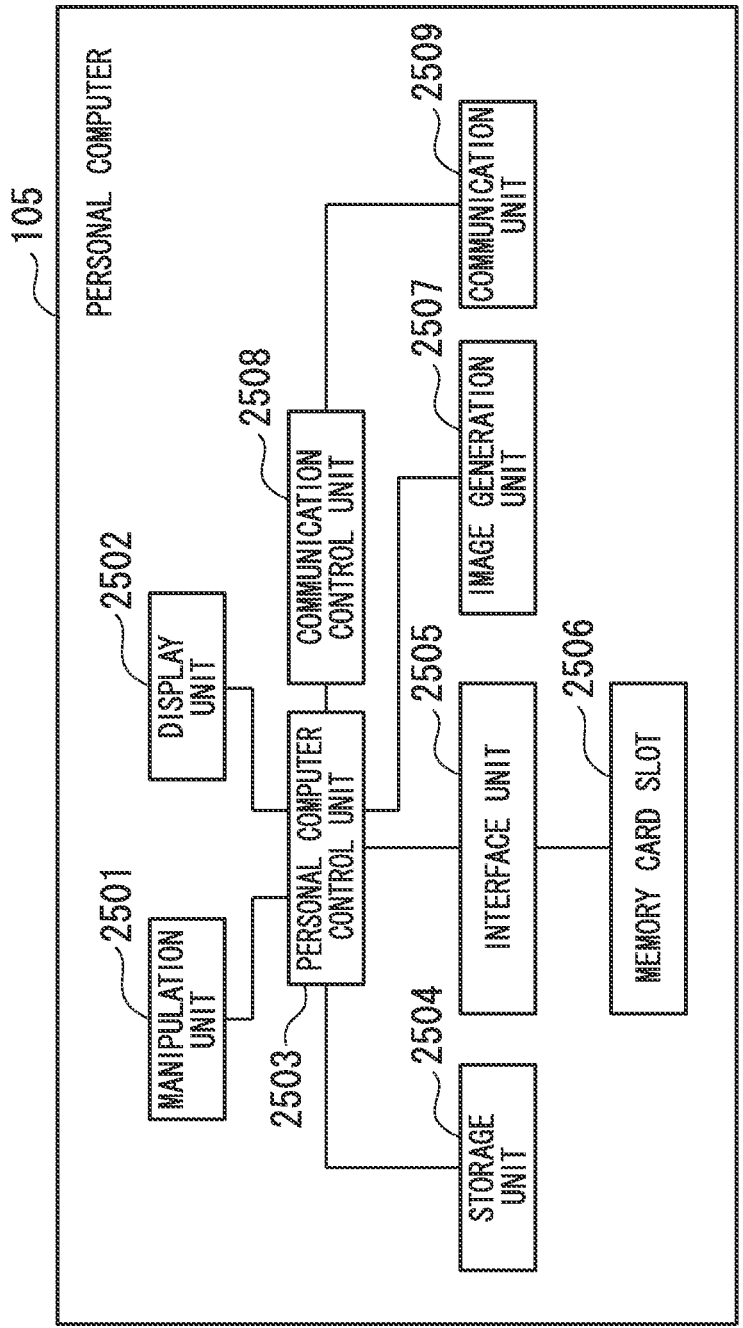
FIG. 25 is a block diagram illustrating a configuration of the personal computer in accordance with the first preferred embodiment of the present invention.

In the above description, the method of generating the network setup image file corresponding to the network setup information in the memory card 102 has been described. However, when the network setup is performed using the personal computer 105, the personal computer 105 may generate the network setup image file. FIG. 25 is a block diagram illustrating a configuration of the personal computer 105 in this case. The personal computer 105 includes a manipulation unit 2501, a display unit 2502, a personal computer control unit 2503, a storage unit 2504, an interface unit 2505, a memory card slot 2506, an image generation unit 2507, a communication control unit 2508, and a communication unit 2509.

The manipulation unit 2501 includes a keyboard or a mouse manipulated by the user. The display unit 2502 displays, for example, an image based on the image file. The personal computer control unit 2503 performs control of the inside of the personal computer 105, such as control of writing of the image files and the network setup information to the memory card inserted into the memory card slot 2506. The storage unit 2504 stores data such as a software program operating on the personal computer 105, or the network setup information. The interface unit 2505 records the network setup information and the network setup image file in the memory card 102 inserted into the memory card slot 2506.

The image generation unit 2507 includes an image data encoder, and generates an image file according to the network setup information input by the user manipulating the manipulation unit 2501. The communication control unit 2508 includes a communication protocol for performing data communication with an external device such as an access point 103, and performs control of the communication function. The communication unit 2509 performs data communication according to an instruction of the communication control unit 2508.

Figure 26:
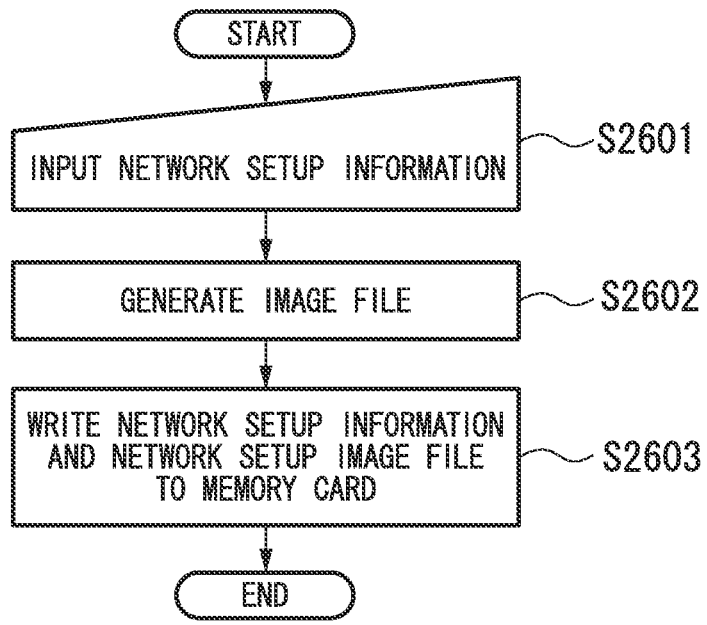
FIG. 26 is a flowchart illustrating a procedure of operation of the personal computer in accordance with the first preferred embodiment of the present invention.

FIG. 26 is a flowchart illustrating a procedure of operation of the personal computer in accordance with the first preferred embodiment of the present invention. Hereinafter, a process in which the personal computer 105 generates an image file will be described with reference to FIG. 26. First, a user inserts the memory card 102 into the memory card slot of the personal computer 105 to activate software for performing network setup. The user inputs network setup information on the software, and the personal computer control unit 2503 acquires network setup information input by the user and stores the network setup information in the storage unit 2504 (step S2601).

The personal computer control unit 2503 outputs an image generation command and the network setup information to the image generation unit 2507. The image generation unit 2507 generates a network setup image file corresponding to the network setup information (step S2602). As a method of generating the network setup image file, the method described using FIG. 12 is used.

Finally, the personal computer control unit 2503 outputs the network setup information and the network setup image file associated with the network setup information to the interface unit 2505. The interface unit 2505 writes the network setup information and the network setup image file to the memory card 102 inserted into the memory card slot 2506 (step S2603). In this case, in the memory card 102, the network setup information and the network setup image file are input to the interface unit 201, and the memory control unit 202 records the input network setup information in the setup recording unit 206 and records the input network setup image file in the memory unit 205.

Through this process, a network setup image file for identifying the network setup information can be generated using an external device such as the personal computer 105 rather than the memory card 102 and recorded in the memory card 102.

Figure 27:
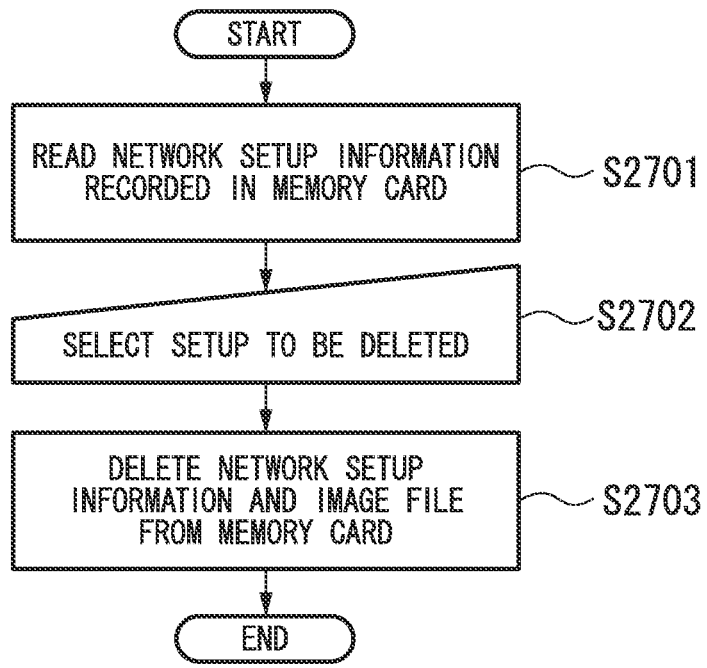
FIG. 27 is a flowchart illustrating a procedure of operation of the personal computer in accordance with the first preferred embodiment of the present invention.

If the network setup is performed using the personal computer 105, data about network setup that has been previously performed may be desired to be deleted. FIG. 27 is a flowchart illustrating a procedure of operation of the personal computer in accordance with the first preferred embodiment of the present invention. Hereinafter, an example in which the network setup information and the network setup image file are deleted will be described with reference to FIG. 27.

The personal computer control unit 2503 first reads the network setup information recorded in the memory card 102 via the interface unit 2505, outputs the network setup information to the display unit 2502 so that content of the network setup information is displayed on the display unit 2502 (step S2701). The user performs a manipulation to select, on the software, network setup information desired to be deleted by manipulating the manipulation unit 2501 and inputs a selection instruction and a deletion instruction (step S2702).

If the selection instruction and the deletion instruction are input, the personal computer control unit 2503 outputs instruction information indicating deletion of the selected network setup information and the network image file corresponding to the network setup information to the memory card 102 via the interface unit 2505 to delete the network setup information and the network setup image file (step S2703). In this case, in the memory card 102, the instruction information is input to the interface unit 201, and the memory control unit 202 deletes the network setup information indicated by the instruction information from the setup recording unit 206 based on the input instruction information, and also deletes the network setup image file corresponding to the network setup information from the memory unit 205. Through this process, the network setup information and the network setup image file recorded in the memory card 102 can be deleted.

As described above, according to the memory card of the first preferred embodiment, when the image file is processed based on the instruction information input from the digital camera, the network setup is performed based on the network setup information corresponding to the image file, thus easily performing setup for a connection to a wireless network. Furthermore, a connection to the wireless network desired by the user can be performed without changing the user interface of the digital camera.

Also, according to the image generation apparatus such as a personal computer of the first preferred embodiment, the network setup information and the image file corresponding to the network setup information are recorded in the memory card of the first preferred embodiment, such that the information for easily performing the setup for a connection to a wireless network can be recorded in the memory card.

Also, the time stamp is set in the network setup image file so that the time stamp of the network setup image file is earlier in terms of time than that of other content data. This results in less effort for the user to search for a network setup image, such that user convenience can be improved. Furthermore, the time stamps of the respective network setup image files are set according to priorities assigned to the network setup image files. Accordingly, the network setup images can be displayed in order of high priorities, such that user convenience can be improved.

Further, the judgment is made as to whether the memory card can connect to a wireless network corresponding to the network setup information, and a network setup image file corresponding to only network setup information of a wireless network judged to be a wireless network to which the memory card can connect is generated, thus preventing a connection to a wireless network to which the memory card cannot connect from being attempted.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A memory comprising:
    a communication unit that performs a wireless communication;
    a storage unit that stores setup information of a wireless network, the wireless network being used to perform the wireless communication;
    a generation unit that generates image files in which an image file used to identify the setup information of the wireless network is included;
    an interface unit that outputs the image files to a device including a memory interface according to an instruction from the device, while a display instruction regarding the image files displayed on the device and an operation instruction regarding the image files being displayed on the device are input to the interface unit from the device;

a memory control unit that selects an assigned image file from the image files displayed on the device based on the display instruction input to the interface unit and the operation instruction;

and a communication control unit that performs network setup based on the setup information of the wireless network identified by the selected image file.

2. The memory according to claim 1, wherein the storage unit further stores content data having a time stamp set therein, and the generation unit sets a time stamp in the generated image file based on the time stamp of the content data.

3. The memory according to claim 2, wherein the generation unit sets the time stamp in the image file so that the time stamp of the image file is earlier in terms of time than that of the content data.

4. The memory according to claim 1, wherein a priority is set in the setup information of the wireless network, and the generation unit sets a time stamp in the generated image file based on the priority of the setup information of the wireless network.

5. The memory according to claim 1, further comprising:

a judgment unit that determines whether or not the memory is capable of connecting to a wireless network that corresponds to the setup information of the wireless network, wherein the generation unit generates the image file that corresponds to only the setup information of the wireless network corresponding to the wireless network that has been determined to be a wireless network to which the memory is capable of connecting by the judgment unit.

6. The memory according to claim 1, wherein, the memory control unit performs network setup based on the setup information of the wireless network that is identified by the image file, which has been output to the device, among the image files stored in the storage unit.

7. The memory according to claim 1, wherein the generation unit generates the image files that includes an image file used to identify whether or not a wireless network corresponding to the setup information of the wireless network is connected, and when the wireless network is connected or disconnected according to the network setup performed by the communication control unit, part of the image file that identifies whether the wireless network is connected or disconnected in the image file that identifies the setup information of the wireless network corresponding to the connected wireless network or the disconnected wireless network is updated.

* * * * *